US006738462B1

(12) United States Patent
Brunson (10) Patent No.: US 6,738,462 B1
(45) Date of Patent: May 18, 2004

(54) UNIFIED COMMUNICATIONS AUTOMATED PERSONAL NAME ADDRESSING

(75) Inventor: Gordon R. Brunson, Broomfield, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 484 days.

(21) Appl. No.: 09/619,276

(22) Filed: Jul. 19, 2000

(51) Int. Cl.$^7$ ................................................ H04M 1/56
(52) U.S. Cl. ............................ 379/142.06; 379/142.04; 379/142.17
(58) Field of Search ........................ 379/142.01, 142.04, 379/142.06, 142.15, 142.16, 142.17, 93.24, 93.23, 100.08, 88.13, 88.5, 88.17, 88.19, 88.21, 88.22; 709/206, 245, 203, 219, 217, 218; 707/10, 104.1; 370/352, 389, 354, 412

(56) References Cited

U.S. PATENT DOCUMENTS 6,005,928 A * 12/1999 Johnson ................. 379/142.01
6,018,761 A * 1/2000 Uomini ...................... 709/206
6,047,054 A * 4/2000 Bayless et al. ......... 379/202.01
6,249,579 B1 * 6/2001 Bushnell ................ 379/356.01
6,298,128 B1 * 10/2001 Ramey et al. ......... 379/142.01

* cited by examiner

Primary Examiner—Curtis Kuntz
Assistant Examiner—Barry W. Taylor
(74) Attorney, Agent, or Firm—Sheridan Ross P.C.

(57) ABSTRACT

A unified communications automated personal name addressing system is provided. The system creates personal address books for system subscribers automatically, without requiring the manual entry of name and address pairs by the subscriber. The system enables a subscriber to appropriately address a communication by providing the name of the intended recipient. In particular, the system of the present invention allows a subscriber to conveniently address any type of communication that may be sent from a unified communication server, even while interfacing with the unified communications server using a conventional voice telephone.

24 Claims, 4 Drawing Sheets

| 409 | 406 MAINTENANCE | 408 | 410 | 412 NAME AND ADDRESS PAIRS | 415 | 413 | 414 |
|---|---|---|---|---|---|---|---|
| USE COUNT | RE-USABILITY | DATE | NAME TAG | ALT. NAME TAG | VOICE TAG | SCENARIO | ADDRESS |
| 5 | 1 ADMINISTERED | 1/28/2000 | CHARLES BROWN | CHARLIE | 🔊 "CHARLES" | VOICE | 303-234-5678 |
| 4 | 1 ADMINISTERED | 1/28/2000 | CHARLES BROWN | CHARLIE | · · · | FAX | 303-234-5679 |
| 10 | 2 ASSERTED | 1/20/2000 | CHARLES BROWN | CHARLIE | · · · | MESSAGE | cbrown@ACME.COM |
| 1 | 3 RECEIVED | 1/18/2000 | ACME CO. | · · · | · · · | VOICE | 303-234-5000 |
| 1 | 8 INVALID | 1/18/2000 | ACME CO. | · · · | · · · | VOICE | 303-234-5000 |

402 COMMUNICATION LOG 404

COMMUNICATION LOG 126

| | MAINTENANCE 402 | | | NAME AND ADDRESS PAIRS 404 | | | |
|---|---|---|---|---|---|---|---|
| USE COUNT 409 | RE-USABILITY 406 | DATE 408 | NAME TAG 410 | ALT. NAME TAG 412 | VOICE TAG 415 | SCENARIO 413 | ADDRESS 414 |
| 5 | 1 ADMINISTERED | 1/28/2000 | CHARLES BROWN | CHARLIE | 🔊 "CHARLES" | VOICE | 303-234-5678 |
| 4 | 1 ADMINISTERED | 1/28/2000 | CHARLES BROWN | CHARLIE | ... | FAX | 303-234-5679 |
| 10 | 2 ASSERTED | 1/20/2000 | CHARLES BROWN | CHARLIE | ... | MESSAGE | cbrown@ACME.COM |
| 1 | 3 RECEIVED | 1/18/2000 | ACME CO. | ... | ... | VOICE | 303-234-5000 |
| 1 | 8 INVALID | 1/18/2000 | ACME CO. | ... | ... | VOICE | 303-234-5000 |

UNIFIED COMMUNICATIONS AUTOMATED PERSONAL NAME ADDRESSING

FIELD OF THE INVENTION

The present invention relates to automated personal name addressing in a multimedia messaging environment.

BACKGROUND OF THE INVENTION

Unified communications systems combine the functionality of a centralized voice/fax/e-mail messaging system (i.e. a unified messaging system, such as the Intuity® or Any-Path® system of Lucent Technologies Inc.) with the functionality of a live communications network (e.g., the public switched telephone network or a private branch exchange) to enable subscribers to reply to calls or messages, or to make calls or send original messages. In a unified communications system, messages in the form of e-mail are common. E-mail addressing typically requires the entry of alpha-numeric strings, including special characters that are not normally found on the keypad of a telephone. Because the entry of alpha-numeric strings and special characters from a telephone is at best cumbersome, most unified communications systems restrict the addressing of messages originating from a telephone interface with the unified communications system to those addresses that have been preadministered in a system directory, or that can be identified uniquely by a telephone number. Therefore, providing a convenient messaging system in a unified communications system typically requires the association of message addresses with the names of recipients by a directory administrator. Although the creation of such a directory is feasible in a corporate environment where the directory generally includes only employees of the enterprise, such a solution is not available to users requiring address directories made up of addressees outside of the enterprise.

In the enterprise environment, a shared system directory that is prepared by a directory administrator and that is searchable by the name of the addressee generally allows a user to locate a desired address by speaking or otherwise entering the addressee's name, without the need to enter a complicated address. However, these techniques are not scalable into the service provider or Internet markets because the concept of sharing a corporate directory to improve internal corporate communications does not apply to individuals who subscribe to service provider services. Also, a comprehensive directory could produce so many hits (or matches) upon entering a name that disambiguation of the returned addresses would often be too complicated and time consuming for the common user. Furthermore, the creation of a unified directory in a geographic area for use by individual consumers would be inefficient, as the vast majority of the addressees included in such a directory would be of no interest to other local consumers. In addition, such a directory would be unreliable, since it would be in a nearly constant state of change, and since there would be no ability to validate new addresses, as no single authority exists for the assignment of all of the various forms of addressing that may be accessible through a unified communications system.

In order to enable e-mail addresses to be entered from a telephone, voice mail vendors have attempted to map telephone numbers to e-mail mailboxes. However, such schemes become untenable when there is not a one-to-one correspondence between telephone numbers and e-mail addresses. Computer application programs providing personal address books are available, however, these programs generally require manual pre-administration by the user, and users are not inclined towards completing tasks ahead of time that are not directly related to a communications scenario. Therefore, existing systems provide no satisfactory method of automatically creating a personal directory of addresses for use by individual subscribers of unified communications systems.

SUMMARY OF THE INVENTION

The present invention is directed to solving these and other problems and disadvantages of the prior art. Generally, according to the present invention, an address repository or communications log is maintained on the unified communications system server on behalf of each subscriber. The communications log includes a name and address pair for each communication scenario, such as a phone call, a voice mail, a fax message, an Internet phone call, an e-mail or instant messaging service message, that is received or sent by the subscriber using any communications channel monitored by the server and having an address associated with the subscriber. When the communications scenario involves a message, the name and address pair may be collected by parsing the header information associated with the message. When it involves an incoming call, the name and address (number) information may be derived from the network call set-up message (e.g. SS7-1SUP, ISDN, or caller identification (caller ID)) information conventionally received as part of the telephone answering scenario. The address (number) associated with outgoing voice or facsimile telephone calls made while connected to the unified communications system may be collected, and a name associated with each number by either referring to a network for number-to-name mapping, or by prompting the subscriber to record a brief voice tag to associate with the number. This voice tag would be used in place of the text-name confirmations when confirmations are played. It would also serve as a prompt for entering a text-name at a later time when accessing the universal communications server using a text-capable instrument such as a P.C.

In a further embodiment, more complete telephony integration techniques can be employed to capture both dialed call information and incoming call information for telephony call scenarios that are completed without involving the unified communications system. For example, the name and telephone number pair associated with a call to or from the subscriber's telephone may be collected by a telephony circuit switch operating in cooperation with the unified communications server. If the switch collects only a number, the universal communications server can perform a reverse phone number look up on the network to obtain the associated name. Name and address pairs so collected may then be automatically added to the communications log. It is important that these name/address pairs be stored together in the subscriber's communication log so that the search scope is limited for touch tone look-up and voice recognition look-up.

The individual subscriber may also add entries to a server side personal address book using a graphical user interface to enter name, e-mail address, voice and facsimile telephone number information and other addressing information in a conventional manner. Name and address pairs entered by the subscriber in the personal address book are automatically made a part of the communications log. Also, using a graphical user interface, previously captured number/voice tag pairs can be revised to have a full text-name added.

The communications log is intended to be used as a directory by a variety of client devices or applications in support of their associated name-addressing and name-dialing scenarios. These clients include standard e-mail clients, which access the communications log via a standard lightweight directory access protocol (LDAP) interface, dual tone multiple frequency (DTMF) telephone user interfaces, which access the directory by entering the DTMF key spelling of the recipient's name, voice command telephone user interfaces, which access the directory by speaking the name of the recipient, and web-based graphical user interfaces, which access the directory by typing a partial name or by scrolling through the log to pick a recipient.

A web-based graphical user interface may also be used to directly enter, modify, or validate the entries in the communications log. For example, this communications log administrative user interface may be used to import the contents of a personal address book into the communications log. It may also be used to directly administer new entries into the log, or to complete partial entries in the log such as entries with only voice-tags that require text names to become complete name address pairs.

The purpose of all name addressing and name dialing scenarios is to select the exact address associated with the proposed name and to provide a confirmation back to the user that the appropriate address has been selected. Since the contents of the communications log evolves automatically as it tracks each new communications event, and since name matching using DTMF key spelling or voice command input can produce multiple matches for a single proposed input, the matched addresses might seem unpredictable without a mechanism to stabilize and prioritize the results.

A re-usability level and a use count is maintained for each name address pair in the communications log to ensure more predictable results on frequently used addresses. When the communications log is searched by name, the scope of the search may be confined to particular reusability levels. For example, a focused search may include only levels one and two, whereas an expanded search (typically used when a correct address is not found in the focused search) may include only levels three through six. Levels seven and eight are always excluded from name searches, but exist in the communications log to prevent failing or erroneous addresses from re-appearing in the log. When a search produces multiple results, the results are returned in priority order first by re-usability level and then by use count. This arrangement ensures that a single appropriate address will be returned on the first attempt in the majority of uses. A subscriber may also access his or her communications log through other interfaces that may be available, such as a computer graphical user interface interconnected to the communications server.

These and other advantages and features of the invention will become apparent from the following description of an illustrative embodiment of the invention taken together with the drawings.

DETAILED DESCRIPTION

Figure 1:
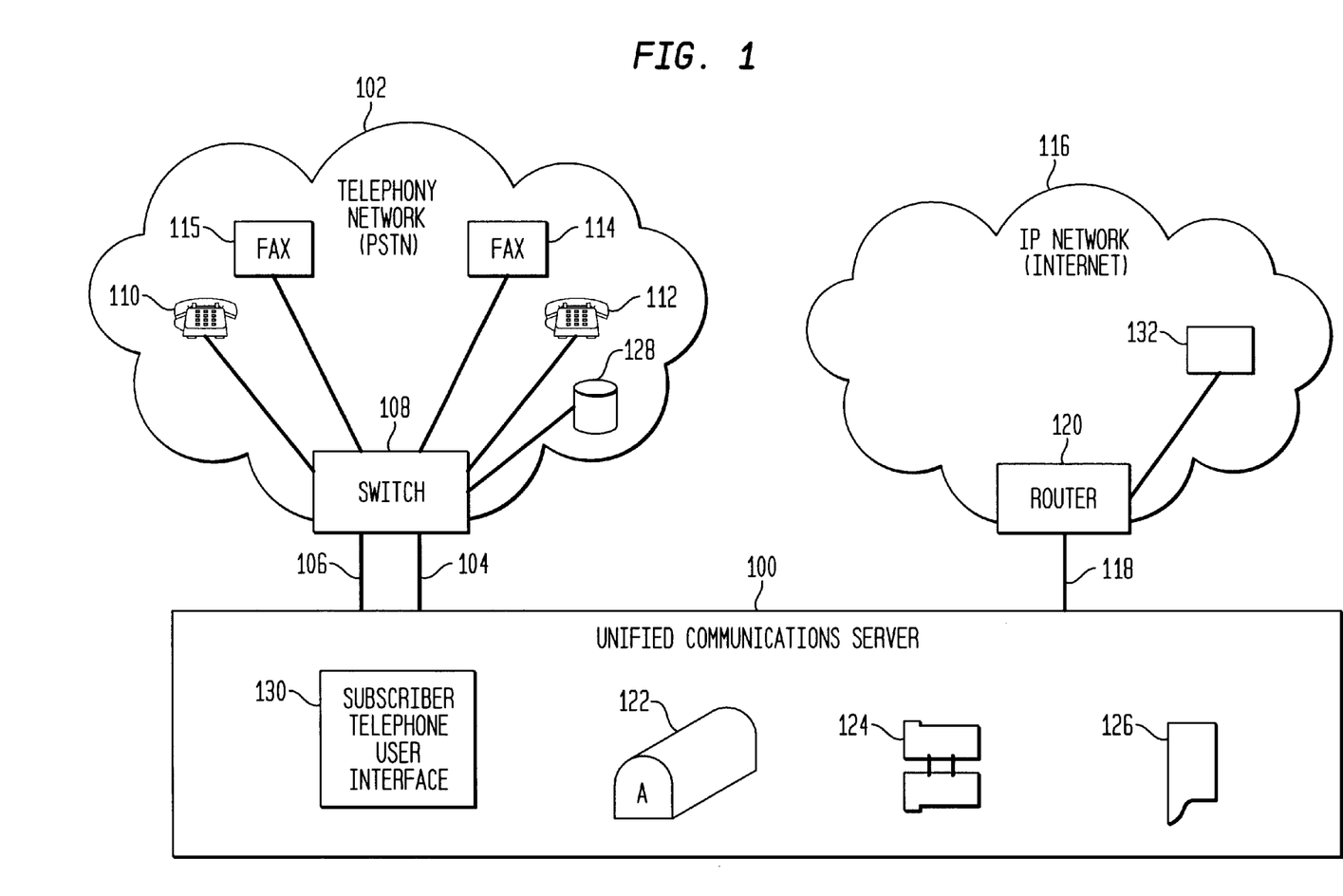
FIG. 1 illustrates the general system topology surrounding a unified communications server according to an embodiment of the present invention.

FIG. 1 illustrates the general system topology surrounding a unified communications server 100. The unified communications server 100 is generally connected to a plurality of communications channels. For example, as illustrated in FIG. 1, the server may be connected to the public switched telephony network (PSTN) 102 over voice trunk 104 and call control 106 lines. The call control line 106 may be a Signaling System 7 (SS7) call control link. In certain cases, the functionality of the call control link and voice trunks may be provided via a single interface, such as an integrated services digital network (ISDN) interface. At the PSTN 102, the voice trunk 104 and call control 106 links are interconnected to a circuit switch 108. The circuit switch 108 is in turn interconnected to a subscriber telephone 110, and either directly through the switch or indirectly through the telephony network 102 to a plurality of non-subscriber telephones 112 and facsimile machines 114. The circuit switch 108 may also be connected to a subscriber facsimile machine 115. Although the unified communications server 100 is illustrated as being directly connected to the PSTN 102, the server 100 may be directly connected to a private branch exchange (PBX) and/or an Internet telephony network, with further connections to the PSTN 102 made through the PBX and/or the Internet telephony network. Also, although a wide variety of subscriber client types may be serviced by the present invention, it should be understood that the system can also be used beneficially by a subscriber having only one or a few of the potential client types.

The unified communications server 100 may also be interconnected to a communications channel comprising a computer network or an Internet protocol (IP) network 116. For example, the server 100 may be interconnected to the Internet. The unified communication server 100 may be interconnected to the Internet protocol network 116 over a computer network link 118. The link 118 may comprise any type of local or wide area network (LAN/WAN). For example, the link 118 may be an Internet protocol link. The link 118 is generally interconnected to a router 120, to provide connectivity to the larger Internet protocol network 116.

The unified communications server 100 includes interfaces for interconnecting the server 100 with the PSTN 102 and the IP network 116 over the various links 104, 106 and 118. In addition, the unified communications server 100 provides a subscriber mailbox 122, a subscriber address book 124, and a subscriber communications log 126. The mailbox 122, address book 124 and communications log 126 may be implemented as a suitably programmed general purpose computer interconnected to the unified communications server 100, or as suitable programming to the server 100 itself. A mailbox 122, address book 124 and communications log 126 are generally provided for each subscriber. The subscriber mailbox 122 generally allows for voice and facsimile messages directed to the subscriber telephone 110 or facsimile machine 115 to be stored. In addition, the mailbox 122 provides storage for electronic mail messages, such as those in the simple mail transfer protocol (SMTP) format and directed to the subscriber's e-mail address and sent over the IP network 116. The mailbox 122 may also provide storage for other types of electronic messages, such as messages directed to a subscriber paging device, short messages directed to a mobile handset, or messages received according to an instant messaging system protocol. A subscriber telephone interface 130 is also provided as part of the unified communications server 100 to allow the subscriber to interact with the server 100 using a telephone 110 or 112.

The subscriber may retrieve messages from the mailbox 122 by placing a telephone call to the unified communications server 100, or otherwise establishing a communications link with the server 100, and having messages stored in the mailbox 122 played back or displayed. Where messages are in a textual form, such as facsimile or e-mail messages, the unified communications server 100 may provide a text to speech (TTS) function to deliver the message to the subscriber over a telephone 110 or 112. The subscriber may also retrieve messages from the mailbox 122 using a client computer 132 connected to the server 100 through a connection made over the IP network 116. Additionally, the subscriber may direct the system to output facsimile messages, or through a text-to-fax facility that may be provided by the server 100, e-mail messages, at a facsimile machine 114 or 115.

According to the present invention, the communications log 126 serves as a repository of name and address pairs for communications originating at or directed to the subscriber mailbox 122, the subscriber telephone 110 the subscriber facsimile machine 115, the subscriber e-mail address, and other subscriber addresses associated with communications channels monitored by the unified communications server 100. The communications log 126 may also contain name and address pairs entered in the address book 124. The address book 124 comprises addresses paired with names that have been entered in the address book 124 by the subscriber. The name and address pairs contained in the address book 124 may be automatically made a part of the communications log 126 after they have been entered in the address book 124.

Figure 2:
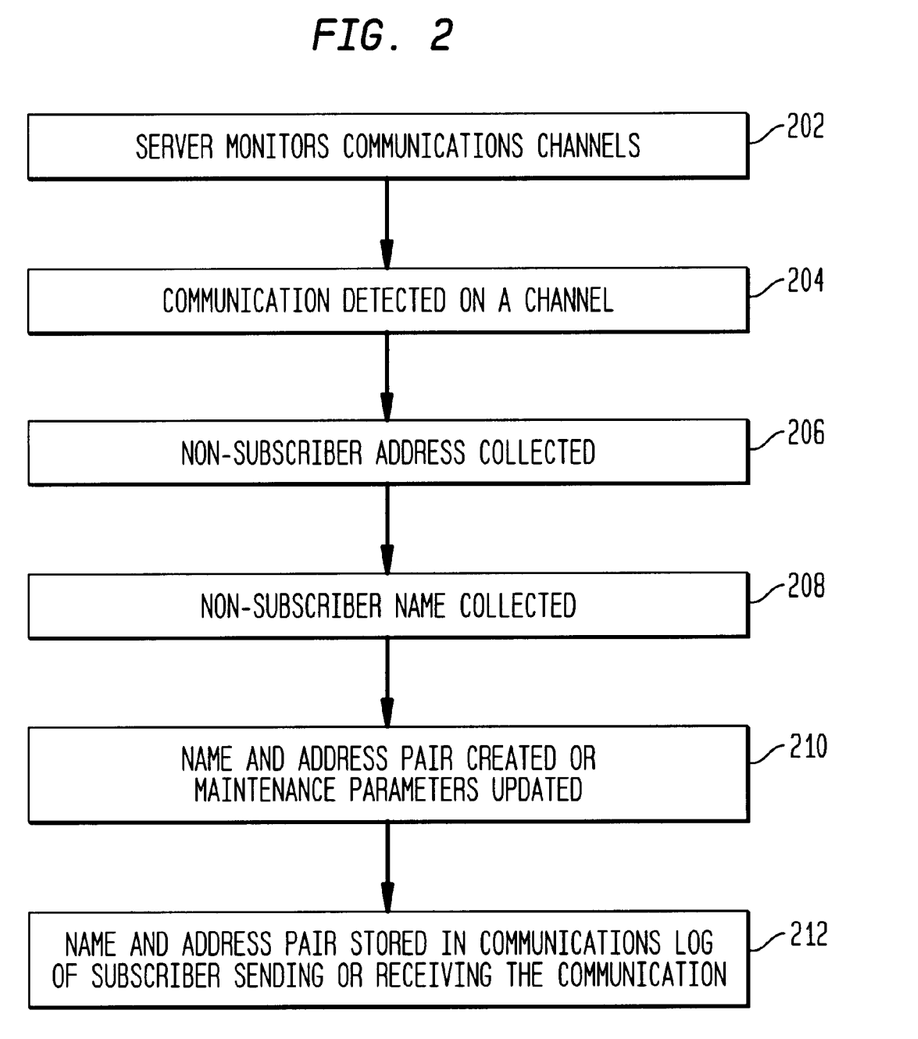
FIG. 2 is a functional flow diagram of the operation of a unified communications personal name addressing system according to an embodiment of the present invention.

With reference now to FIG. 2, the operation of a unified communications automated personal name addressing system according to an embodiment of the present invention is illustrated. Initially, at step 202, the server 100 monitors the communications channels over which communications may be sent to or from a subscriber. At step 204, communication on a monitored channel is detected, and at step 206, the non-subscriber address associated with the communication is collected. That is, the address of the recipient or recipients of a communication sent by the subscriber, or the address of the sender of a communication directed to the subscriber, together with the addresses of peers who also received the sent message, are collected. At step 208, the nonsubscriber name is collected, and at step 210 a name and address pair comprising the collected nonsubscriber address and nonsubscriber name is created or, if the pair already exists, the maintenance parameters are updated. The name and address pair thus created is stored in the communications log 126 belonging to the subscriber with whom the communication is associated. In this general way, name and address pairs are added to a subscriber's communications log 126, generally without requiring action or intervention by the subscriber. The examples set forth below illustrate particular scenarios that can result in the addition of name and address pairs to the communications log 126 of a subscriber.

Figure 3:
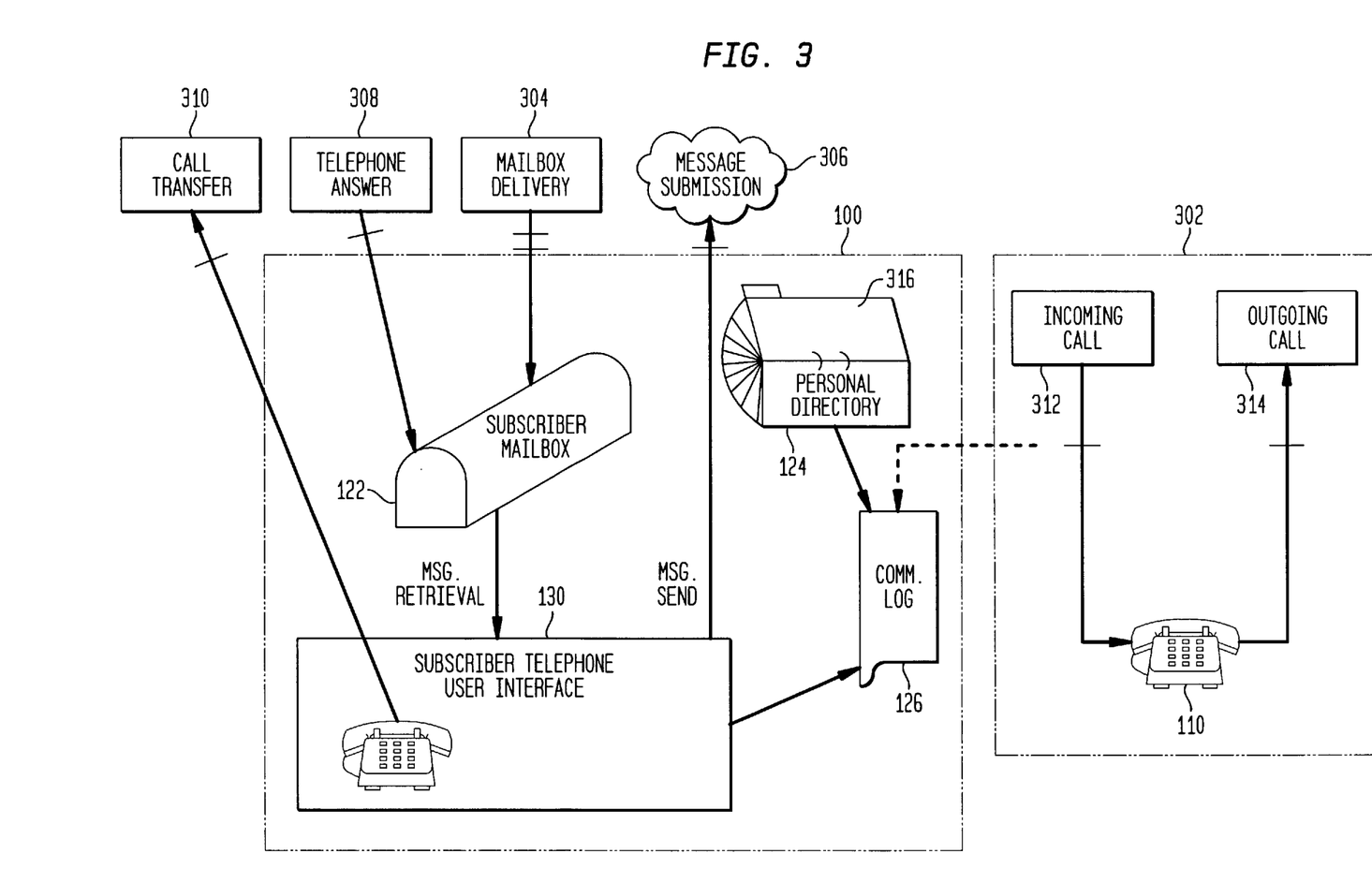
FIG. 3 illustrates various communications scenarios involving a unified communications personal name addressing system according to an embodiment of the present invention.

With reference now to FIG. 3, various communications scenarios involving the unified communications personal name addressing system of the present invention are illustrated. As described above, according to the present invention, the unified communications server 100 includes a subscriber mailbox 122, a subscriber personal address book 124 and a communications log 126. Generally, the illustrated scenarios occur either with the active participation of the unified communications server 100, or as part of "out of server" scenarios 302 external to the unified communications server 100.

According to a first scenario, communications from a sender are deposited directly in the subscriber mailbox 122. This mailbox delivery 304 scenario generally occurs in connection with e-mail messages, such as those sent according to the simple mail transfer protocol (SMTP), or other electronic messaging protocols. In addition, mailbox delivery 304 may include the delivery of addressing information to the subscriber mailbox 122. This information may be delivered to the mailbox 122 as a Multipurpose Internet Mail Extension (MIME) attachment to an e-mail message, with the addressing information formatted according to a predetermined specification. For example, the addressing information may be formatted according to the vCard™ specification administered by the Internet Mail Consortium.

As part of the mailbox delivery 304 scenario, address and name information may be collected from e-mail messages by parsing the information contained in the header of the message to extract the address and name of the sending party. For example, the information contained in the RFC 822 header of a SMTP message may be parsed to extract a name and address pair. Name and address pairs so collected may include the name and address pair of the sender, as well as the names and addresses of any other recipients of the message. Once extracted, this information is stored in the communications log 126 of the unified communications server 100. Preformatted addressing information, such as information contained in a vCard™, generally includes a plurality of addresses associated with a single name. When such information is received, the name and all of the associated addresses may be stored in the communication log 126 as additional name and address pairs.

Electronic communications sent from the communications server 100 may also serve as a source of name and address pairs. Accordingly, name and address pairs corresponding to the recipients of outgoing messages may be captured and those name and address pairs stored in the communications log 126. This message submission 306 scenario automatically enters the name and address pairs of message recipients in the communications log 126 when electronic messages are sent, without requiring the subscriber to manually direct or authorize the inclusion of the pairs in the subscriber's address book.

Another messaging scenario which may provide name and address pairs for to inclusion in the communications log 126 occurs when telephone calls placed to the subscriber telephone 110 are redirected to the unified communications server 100 for service. This telephone answer 308 scenario occurs when no one is available to answer the subscriber telephone 110, or the telephone line associated with the telephone 110 is otherwise in use. Generally, telephone calls placed across the PSTN 102 include associated call information. In many cases, this information includes both the originating telephone number and the name of the holder of that telephone number. The name and address pair obtained from call information may be conventionally provided to the unified communications server 100 over the SS7 call control link 106 or equivalent ISDN functionality. Alternatively, a name and address pair may be obtained from a network directory 128. The name and address pair from scenario 308 can be automatically stored in the communications log 126 upon receipt by the communications server 100.

The call transfer scenario 310 occurs when the subscriber places telephone calls while the subscriber is connected to the unified communications server 100. According to the call transfer scenario 310, the user first connects or is connected to the communications server 100, and the subscriber then enters the digits of the telephone number to be called. The unified communications server 100 uses the dialed telephone number to search a network directory 128 (see FIG. 1) for an associated name. If the search of the network directory 128 returns an associated name, the resulting name and address pair is automatically stored in the communications log 126. If the search is unsuccessful, the unified communications server 100 of the present invention may prompt the subscriber to record a voice tag to associate with the dialed number. This tag is useful to provide name confirmation via playback if the number is used again, and also captures the name which can later be added in text form to the log during a separate log maintenance activity.

Name and address pairs for inclusion in the communications log 126 may also be collected in connection with out of server scenarios 302, which take place without the direct involvement of the unified communications server 100. In the incoming call scenario 312, a telephone call is placed to the subscriber telephone 110, and that call is terminated without involving the unified communications server 100. For example, the subscriber may pick up the telephone 110 or the caller may terminate the call before the telephone 110 is answered by either the subscriber or the unified communications server 100. In this situation, where the switch 108 of the PSTN 102 associated with the subscriber telephone 110 is an intelligent network switch, a software trap condition may be set to collect the originating telephone number. Accordingly, the incoming call scenario 312 is similar to the telephone answer scenario 308 in the way that name and address pairs are collected. Similarly, in an outgoing call scenario 314, a software trap may also be set in an intelligent network switch 108. The numbers trapped in connection with these out of server scenarios 302 may be associated with a corresponding name by referring to a network directory 128, and the name and address pair may be formatted for inclusion in the communications log 126. The name and address pairs thus collected may be communicated to the unified communications server 100 in real time or in batches, and this communication may occur over the SS7 call control link 106 or over an IP network connection service dedicated to receiving communication log batch updates.

Where the switch 108 is not an intelligent network switch, information regarding dialed telephone numbers and associated names may be collected from the call detail records associated with the subscriber telephone 110. However, the use of call detail records generally requires that the name and address pairs collected from the call detail records be delivered to the communications log 126 sometime after the call is made, as the call detail records are generally not immediately available. Accordingly, when name and address pairs are collected using call detail records, they are generally delivered to the communications log 126 in batches over an IP network connection service dedicated to receiving communication log batch updates.

As part of the subscriber submission scenario 316, entries to the communications log 126 may also be made from a subscriber's personal address book 124. A personal directory or address book 124 is a collection of addresses entered or otherwise administered by the subscriber. According to the present invention, the address book 124 information may be automatically added to the communications log 126 for use in combination with the other name and address pairs collected by the system. According to one embodiment, information contained in the address book 124 is automatically added to the communications log 126 as soon as that information is entered in the address book 124 by the subscriber. Alternatively, the subscriber may use a graphical user interface for communications log administration.

According to the present invention, addresses may be marked or identified in the communications log 126 according to the level of confidence in the reusability of the individual name and address pairs. The ranking of name and address pairs according to confidence levels is believed to increase the usability of the system in providing the subscriber with the intended address, simplifies the disambiguation of similar names, and increases the accuracy of the system.

A first level of reusability in a name and address pair is assigned to entries that have been administered. Administered entries include those entered by the subscriber or created by some authority. Accordingly, administered addresses include those name and address pairs originating from the subscriber's personal directory 124, entries in the communications log 126 that were automatically collected and that have been edited or otherwise administered by the subscriber, and administered directories obtained from, for example, enterprises, that have been added to the communications log 126.

At a second level of re-usability are used name and address pairs. These include dialed numbers and addresses found in the "To:", "CC:" and "BCC:" headers of mail sent by a subscriber. These are asserted to be accurate by the subscriber. If an "@" appears in the name field of an RFC822 header, it is considered an uninitialized name.

At a third level of reusability are received name and address pairs. Received name and address pairs include names and addresses parsed from header information attached to incoming e-mail messages, caller ID or network directory information associated with an incoming telephone call, and addressing information received in a vCard™ or in a message formatted according to some other electronic messaging protocol. Such received name and address pairs are likely to be accurate, because they are usually associated with the incoming message or telephone call automatically by the sender's electronic messaging application or by the telephone system network directory.

A fourth level of reusability may be assigned to the name and address pairs of other recipients of a message, for example, the names and addresses of other persons to whom an e-mail message was sent (i.e. peers copied). These associated name and address pairs are generally assigned a lower level of confidence than asserted name and address pairs.

A fifth level of reusability may be assigned to name and address pairs from categories levels one through four of another user's communication log. Strictly speaking, these level five entries are not name and address pairs, but rather indicators that additional associated communication logs may be searched in an expanded search. This capability is useful, for example, in family mailbox scenarios where individual family members have private mailboxes, but share the use of a common residential telephone number.

A sixth level of reusability is assigned to addresses which temporarily fail. Delivery status notification messages and failed call attempts may demote the reusability level of an address so that it is only found in an expanded search. As communication addresses are monitored, valid addresses are reassigned to the highest reusability level observed. "Last Date" and "Use Count" fields are updated on each use of an address.

A seventh level of reusability is assigned to incomplete entries. These may be phone numbers without names and with or without voice tags. They may also be e-mail addresses without names or where the name field contained a string which included the symbol @ indicating that an address was used in place of the name. Incomplete entries are excluded from name searches, however they are included in the communications log so that they may be promoted to administered entries by supplying a text name as part of an infrequent communications log administration activity.

As an eighth category, certain name and address pairs may be considered invalid. Invalid name and address pairs include names associated with telephone numbers for trunk lines, rather than telephone numbers associated with the extension of the named party, or e-mail addresses from bulk mailers. Although invalid name and address pairs are not considered reusable, it is valuable to retain such pairs in the communications log 126. This is because such name and address pairs can prevent further invalid entries from being considered, for example, received entries, and used to send a message to an incorrect address. Similarly, the recognition of invalid entries can prevent the system from automatically removing or altering valid name and address pairs.

Figure 4:
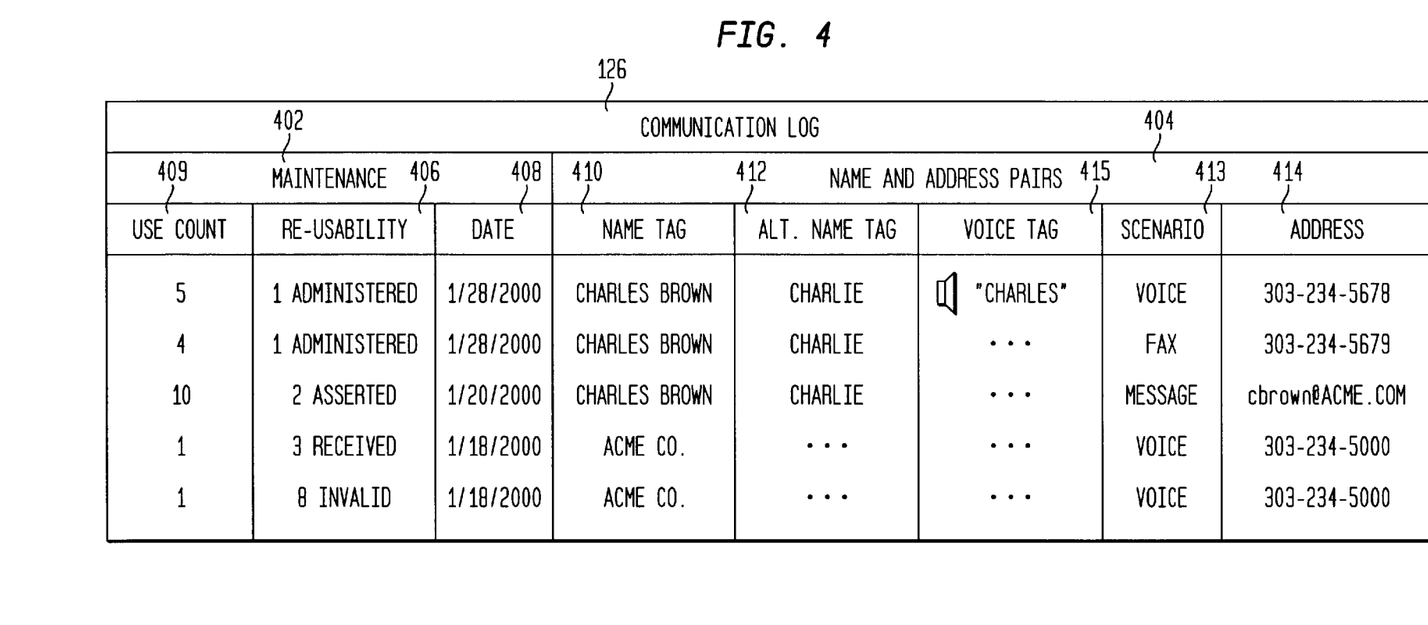
FIG. 4 illustrates a communications log according to an embodiment of the present invention, including examples of entries that may be contained in such a log.

With reference now to FIG. 4, entries in a communications log 126 according to an embodiment of the present invention may generally include maintenance items 402, and name and address pairs 404. Generally, for each maintenance item 402 there is a corresponding name and address pair 404. The maintenance items 402 may include the reusability level 406 assigned to the name and address pair, the date 408 on which it was last entered in the communications log 126, and the use count 409, which is the number of times the address has been used by the subscriber. The listing of name and address pairs 404 may conveniently be subdivided into name tags 410, alternate name tags 412, scenario classifications 413, addresses 414, and optional voice tags 415. The name tag 410 is generally the formal name associated with a particular address. The alternate name tag 412 may be used by the subscriber to assign a shorthand or alternate name with which to identify a particular address. The voice tag 415 is a voice recording associated with an address that may be spoken and recorded by the subscriber who is using only a telephone handset. The voice tag captures the name that should later be transcribed into the name tag or alternate tag. The voice tag is also useful as a confirmation played to the subscriber whenever this name and address pair is selected. The scenario classification 413 column indicates the supported communication method or methods associated with a given address, and the address 414 column includes the addressing information, for example the telephone number or e-mail address, associated with the name tag.

Generally, when accessing the unified communications server 100 from a telephone 110 or 112, the subscriber may select a name from the communications log 126 by querying the log 126 using any one of a variety of methods. For example, the subscriber may use known touch tone name dialing techniques. Accordingly, as is well-known in the art, the subscriber may begin to spell the name of the person to which a message or telephone call is to be addressed using the key pad of a telephone 110 or 112. The name entered may be either the name tag 410 or the alternate name tag 412, if available. Alternatively, the subscriber may say the name of the person to which the message is to be addressed or the telephone call made. As is well known in the art, the use of such voice addressing requires that phoneme strings be created for each name tag 410, alternate name tag 412 for which voice addressing is to be available.

In order to address a message or place a call using the system of the present invention, a subscriber typically must access the unified communications server 100.

This may be accomplished by, for example, placing a telephone call to the unified communications server 100 from the subscriber telephone 110, or from some other telephone 112. Access may be established by telephoning the unified communications server 100 directly, or, for example, when the subscriber telephone 110 is used, by an automated connection to the unified communications server 100 through, for example, a switch 108 having advanced intelligence. The server 100 may also allow a subscriber to access his or her communications log 126 from a computer 132 interconnected to the server 100 over a computer network link 118. After communication with the unified communications server 100 is established, the subscriber may perform various actions in connection with the communications log 126. When messages or calls are to be directed to a recipient, the subscriber may choose the name of a recipient, and thereby address the communication, using touch tone dialing or voice addressing as described above. Because the communications log 126 will typically contain multiple addresses associated with each name tag corresponding to multiple scenario types, a choice must be made as to which address 414 is appropriate for a given communication. This determination may be made in a variety of ways.

In certain instances, the appropriate address 414 for a communication can be determined from the context in which the addressing selection is made. For example, where an in-progress telephone call is to be transferred to another telephone number, it is apparent from the context of the addressing request that a voice telephone number is the appropriate address 414. Similarly, where an e-mail message is to be forwarded to a recipient, the system can assume that the appropriate address 414 is an electronic messaging address. Where the appropriate address can be determined from the context of the addressing request, no further intervention is required by the subscriber.

The designation of the appropriate address 414 may also be made by the subscriber explicitly. Thus, the subscriber may issue a voice addressing command such as "call Charles Brown." In the given example, the subscriber has explicitly instructed the system to place a telephone call to Charles Brown. Accordingly, the system will choose the name and address pair 404 having the name tag 410 "Charles Brown", the scenario type 413 "voice", and the address 414 "303-234-5678." As a further example, the subscriber may issue the command "message Charlie." According to this example, the name and address pair 404 having the alternate name tag 412 "Charlie", the scenario type 413 "message", and an address 414 associated with a messaging scenario, here "cbrown @acme.com" is selected for addressing the communication.

The system may also provide the subscriber with prompts to disambiguate the desired messaging scenario. For example, the system may prompt "press 1 for voice call and 2 for message." The appropriate input by the subscriber in response to such a prompt, in combination with the selection of a name tag 410 or alternate name tag 412, will associate the proper name and address pair 404 with the outgoing communication.

When a subscriber issues a voice command or commences name dialing, the system may search the communications log 126 in a way that minimizes the need for the subscriber to disambiguate similar or matching name tags 410 or alternate name tags 412. Accordingly, the present invention performs a focused search among often used name and address pairs 404 to offer first the address most likely to be reused in an outgoing communication. If additional entries might match the request, the subscriber is offered alternate choices requiring additional input to disambiguate the desired recipient. If the requested name tag 410 or alternate name tag 412 is not returned after searching the administered and received names 404, the search may be expanded to include additional levels of name and address pairs 404. Additionally, the search may initially return only the highest priority name and address pair 414 associated with a specified name, with additional matched names being offered as alternate choices according to first their reusability level, and then according to their use count 409.

Occasionally the subscriber may determine that an address in the log is not valid or is no longer valid. The subscriber may then mark such an address as invalid and it remains in the log, unable to have its reusability level promoted automatically. The inclusion of invalid name and address pairs in the communications log 126 is useful in maintaining a list of usable addresses in the communications log 126. Some numbers and addresses should never be used in return call or reply scenarios. For example, a call from a pay phone, or a call placed from an enterprise having a private branch exchange (PBX), where the originating telephone number returned by a caller ID system may not reflect the number and extension required to return a call back into the PBX. Numbers such as these should be retained in the communications log 126, but marked invalid. They should never be returned by a name query. Additionally, these addresses may not have their reusability level promoted automatically. If the address is ever seen again by the unified communications server 100 it will be recognized as invalid, and it will not be added again to the communications log 126 as a possible useable address.

According to one embodiment of the present invention, the reusability level 406 associated with a particular name and address pair 404 reflects the highest level attained by the name and address pair. The use count 409 is incremented each time that a particular name and address pair 404 is used by the subscriber. Generally, only a focused search, which returns entries having a reusability level of 1 (administered) or 2 (asserted) is conducted. If a focused search does not return any name and address pairs 404, or if the search does not return the desired name and address pair 404, the search may be expanded. An expanded search may include levels 3–6. Levels 7 and 8 are never returned in response to a search, as reusability levels 7 and 8 are used to identify incomplete entries or entries that have resulted in failed attempts to address communications or that are obsolete. Where multiple matches within a reusability level 406 are returned to a subscriber following a search, they are ordered according to the use count 409 from the most to the least commonly used. The communications log 126 may be administered by the subscriber, to promote any entry in the log 126 to a type 1 administered entry or to demote any entry to a type 8 obsolete entry. The subscriber may also delete entries from the communications log 126.

The communications log 126 may, at the option of the subscriber, be divided into subgroups. For example, the subscriber may maintain a first list containing business-related name and address pairs 404, and a second list containing name and address pairs 404 associated with family members and friends. Additionally, the communications log 126 may be available to a subscriber from a plurality of telephone numbers or messaging addresses. For example, a subscriber may maintain the same communications log 126 for use with respect to a home telephone, a business telephone number, a facsimile number, a wireless telephone, and one or more e-mail addresses.

Although the description given above has generally been described in terms of voice telephone numbers and e-mail addresses, it should be understood that the present invention is not so limited. For example, the invention is equally useful in connection with facsimile numbers. The invention may also be used in connection with pager addresses, and with instant messaging address protocols. In general, any form of electronic communication may be used in connection with the present invention.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include alternative embodiments to the extent permitted by the prior art.

What is claimed is:

1. A method of creating a directory of addresses having a plurality of formats for use with a unified communications system, comprising:

simultaneously monitoring a plurality of communications channels for an incoming or outgoing communication;

collecting a first address associated with a first communication on at least a one of said channels;

collecting a first name associated with said first communication on at least a one of said channels;

pairing said first address with said first name to create a first name and address pair;

collecting a second address associated with a second communication or at least a one of said channels;

collecting a second name associated with said second communication;

pairing said second address with said second name to create a second name and address pair;

assigning a first one of a plurality of confidence levels to said first name and address pair, wherein said first one of a plurality of confidence levels measures a perceived accuracy of said first name and address pair;

assigning a second one of said plurality of confidence levels to said second name and address pair, wherein said second one of a plurality of confidence levels measures a perceived accuracy of said second name and address pair; and storing said first and second name and address pair in a communications log, wherein said first name and address pair is ranked higher than said second name and address pair.

2. The method of claim 1, wherein said step of collecting a first address comprises collecting an address from an incoming communication.

3. The method of claim 1, wherein said step of collecting a first address comprises collecting an address from an outgoing communication.

4. The method of claim 1, wherein said step of collecting a first address comprises accessing addressing information formatted according to a predefined specification.

5. The method of claim 4, wherein said predefined specification is the vCard™ specification.

6. The method of claim 1, wherein at least one of said first address and said second address is selected from the group consisting of a telephone number, a facsimile number, a pager number, an e-mail address, a computer network address, and an Internet address.

7. The method of claim 1, further comprising receiving input from a user, wherein said input comprises a name to which an outgoing communication is directed and a method by which said message is to be delivered, wherein said input name comprises said first name; and addressing said outgoing communication, wherein said first address is used.

8. The method of claim 1, further comprising:

receiving an addressee name and communication type selection from a user;

searching said communications log for an address corresponding to said addressee name and said received communication type;

matching said received addressee name to both said first name and said second name;

presenting said first name and address pair to said user;

receiving a selection of said first name and address pair from said user; and associating said first address with a communication to be sent.

9. The method of claim 1, wherein said step of collecting at least one of said first address and said second address associated with a communication on at least a one of said channels comprises recording at least one of caller-ID information, SS7 call control information, ISDN call control information and proprietary PBX control link information.

10. The method of claim 1, wherein said step of collecting at least one of said first address and said second address associated with a communication on at least a one of said channels comprises querying a system database.

11. The method of claim 1, wherein said step of collecting at least one of said first address and said second address associated with a communication on at least a one of said channels comprises parsing a name and address from header information associated with an electronic message.

12. The method of claim 1, wherein said step of collecting at least one of said first address and said second address associated with a communication on at least a one of said channels comprises recording a dialed telephone number and querying a telephone system database.

13. The method of claim 1, further comprising returning one or more of said name and address pairs stored in said communications log in response to a query by a user.

14. The method of claim 13, further comprising addressing an outgoing communication using at least a one of said returned name and address pairs.

15. The method of claim 1, wherein said step of collecting at least one of said first address and said second address associated with a communication on a least one of said channels comprises:

receiving a name that is not stored in said communications log;

collecting from a user an address for said name that is not stored in said communications log;

prompting said user to enter a voice tag; and storing said received name, voice tag and said address in said communications log.

16. The method of claim 1, further comprising:

receiving a third name as a text name from a user;

receiving a third address from said user;

associating said third name with said third address to create a third name and address pair;

assigning a third one of said plurality of confidence levels to said third name and address pair; and storing said text name in said communications log, wherein said address can be accessed by said user, and wherein said third name and address pair is ranked higher than either of said first and second name and address pairs.

17. The method of claim 8, further comprising:

presenting said first name and address pair and said assigned first confidence level to said user; and presenting said second name and address pair and said assigned second confidence level to said user.

18. The method of claim 1, wherein said first name and address pair is an administered entry and is therefore assigned a high confidence level, and wherein said second name and address pair is not an administered entry and therefore is assigned a lower confidence level than said first name and address pair.

19. The method of claim 1, wherein a confidence level is assigned to a name and address pair according to a hierarchy comprising at least two of the following:

(1) administered name and address pairs, (2) used name and address pairs, (3) received name and pairs, (4) the name and address pairs for others receiving a copy of a communication, (5) name and address pairs obtained from another directory of addresses, (6) name and address pairs having addresses that temporarily fail, (7) incomplete entries, and (8) invalid name and address pairs.

20. The method of claim 1, wherein said confidence levels are assigned without regard to a duration or frequency of a completed communication.

21. A messaging system serving a plurality of communications channels, comprising:

a monitor for monitoring said plurality of communications channels to determine when a communication is being sent or received on at least a one of said communications channels;

an address collector in communication with said monitor for collecting an address associated with said communication;

a name identifier for associating the collected addresses with a name and creating name and address pairs;

a confidence ranker for assigning a confidence level to each of said name and address pairs, wherein said confidence level is assigned without regard to a frequency or duration of a completed communication;

a directory for containing said name and address pairs and said assigned confidence level; and a user input to allow a user to select a one of said name and address pairs.

22. The system of claim 21, wherein said plurality of communications channels comprise at least one of a telephone line, a facsimile line, and a computer network.

23. An apparatus for automatically compiling a directory of addresses, comprising:

a unified messaging system;

means for collecting an address associated with a communication;

means for automatically associating said collected address with a corresponding name;

means for assigning a confidence level to said collected address and said corresponding name according to a perceived accuracy of each associated name and address;

means for storing said collected address and said corresponding name, together with said assigned confidence level, in a directory;

user input means for allowing a user to select a name; and means for attaching an address associated with said selected name to an outgoing communication.

24. The apparatus of claim 23 wherein said collected address comprises at least a one of a telephone number, a facsimile number, a pager number, an e-mail address, a computer network address and an Internet address.

* * * * *